United States Patent
Ceriali et al.

(10) Patent No.: US 7,470,443 B2
(45) Date of Patent: Dec. 30, 2008

(54) METHOD OF MAKING AROMATIZATION PARTICLES CONTAINING COFFEE AROMA CONSTITUENTS

(75) Inventors: Stefano Ceriali, Banbury Oxon (GB); Anthony Wragg, Banbury Oxon (GB); Anilkumar Ganapati Gaonkar, Buffalo Grove, IL (US); Bary Lyn Zeller, Glenview, IL (US)

(73) Assignee: Kraft Foods R & D, Inc. (DE)

( * ) Notice: Subject to any disclaimer, the term of this patent is extended or adjusted under 35 U.S.C. 154(b) by 676 days.

(21) Appl. No.: 10/947,723

(22) Filed: Sep. 23, 2004

(65) Prior Publication Data
US 2005/0112265 A1 May 26, 2005

(51) Int. Cl.
*A23F 5/00* (2006.01)

(52) U.S. Cl. .................. 426/387; 426/386; 426/594; 426/596

(58) Field of Classification Search ............ 426/594, 426/386, 387, 596
See application file for complete search history.

(56) References Cited

U.S. PATENT DOCUMENTS

| | | | |
|---|---|---|---|
| 3,979,528 A | 9/1976 | Mahlmann | |
| 3,989,852 A | 11/1976 | Palmer | |
| 4,057,652 A | 11/1977 | Lawerence | |
| 4,520,033 A | 5/1985 | Tuot | |
| 5,124,162 A | 6/1992 | Boskovic et al. | |
| 5,496,574 A | 3/1996 | Rushmore et al. | |
| 5,576,044 A | 11/1996 | Chmiel et al. | |
| 5,741,538 A | 4/1998 | Stipp et al. | |
| 5,750,178 A | 5/1998 | Cheng et al. | |
| 5,882,717 A | 3/1999 | Panesar et al. | |
| 6,544,576 B2 | 4/2003 | Zeller et al. | |
| 2002/0127302 A1 | 9/2002 | Zeller et al. | |

FOREIGN PATENT DOCUMENTS

| | | |
|---|---|---|
| CA | 837021 | 3/1970 |
| EP | 0037675 | 10/1981 |
| WO | 8101094 | 4/1981 |
| WO | WO 96/07333 | 3/1996 |
| WO | 02058481 | 8/2002 |

OTHER PUBLICATIONS

Weiss, T. "Food oils and their uses" 2nd edition (1983).
Sivetz, Aromatizing Soluble Coffee, Instant Coffee Technology, (1979) pp. 434-483.

*Primary Examiner*—Anthony Weier
(74) *Attorney, Agent, or Firm*—Fitch, Even, Tabin & Flannery (57) ABSTRACT

The invention relates to aromatization particles having a water-soluble coffee matrix and an aromatizing composition having volatile characteristic coffee aroma constituents wherein said particles are essentially fat-free and contain essentially no coffee oil, its derivatives or vegetable oil and wherein said water-soluble coffee matrix contains a physically entrapped separate phase of said volatile characteristic coffee aroma constituents, a process for producing same and food products containing same.

12 Claims, 1 Drawing Sheet

METHOD OF MAKING AROMATIZATION PARTICLES CONTAINING COFFEE AROMA CONSTITUENTS

FIELD OF THE INVENTION

The present invention relates to aromatization particles comprising a water-soluble coffee matrix and an aromatizing composition comprising volatile characteristic coffee aroma constituents, a process for producing same and food products containing same.

BACKGROUND OF THE INVENTION

The desirability of enhancing the above cup aroma of soluble coffee has long been recognized. Focus has traditionally been on the aroma carrier, the substrate used to store and release aroma above the cup, and on the encapsulation of aroma.

One of the major problems associated with the current processes for manufacturing soluble coffee is the fact that the powdered product obtained lacks the desired aroma of freshly brewed coffee. This is the result of the loss and degradation of volatile aroma constituents, but also of the difference in the product matrices. Although the roasted coffee matrix is only partially soluble in water, soluble coffee powders and granules are readily soluble in water.

The aroma release from soluble coffee is poor because the aroma constituents are dispersed and locked in the fast dissolving soluble coffee glassy matrix. Due to this situation, the diffusion of the rehydrating liquid into the particle and the fast dissolution rate of the soluble coffee product will cause the majority of the aroma to end up in the brew. The typical aroma loadings of soluble coffee particles currently available on the market is from 50 µg/g to 400 µg/g, and because of the dissolution mechanisms highlighted above it is impossible to increase the aroma loading in the particles without adverse effects on the flavor.

Several food aromatizing compositions and preparation techniques have been attempted and disclosed by the industry over the last 30 years to overcome this problem.

In U.S. Pat. No. 3,989,852 Palmer prepares capsules by forming a viscid core medium, containing the aromatic constituents. This core is added to a film-forming agent which adheres to it and forms the capsule. The resulting capsule has a continuous structure, resulting in a slow dissolution rate and poor buoyancy. No particular attention is paid to the aromatic loading and characteristics. The practical application of this approach results in the encapsulation of aromatic substances, but sub-optimal release above cup upon reconstitution.

In U.S. Pat. No. 4,520,033 Tuot prepares capsules by using Palmer's procedure, but he also introduces an aeration step to facilitate buoyancy of the particles. The resulting capsules have a defined shell and an aerated core. Tuot claims that the aerated core also benefits aroma retention. It is not obvious to somebody skilled in the art that the voids in the core are beneficial to aroma retention. For example, Boskovic in U.S. Pat. No. 5,124,162 teaches the opposite. The patent contains some indications about coffee aroma compositions. In the body of the detailed description of the invention Tuot describes an aroma composition and loading in the capsules which are not optimal and will prevent the desired state from being achieved. Tuot in this same patent also introduces the benefits of coffee oil, a non-aromatic constituent of coffee, as a vehicle for storing and releasing aroma. This is a key feature in this art, since the use of oil will be systematically practiced in the following decades by different authors.

To this end, Garwood in WO 96/07333 discloses a process for encapsulating volatile aroma compounds, consisting of fixing the aromatics in coffee oil, gasifying this coffee oil and co-extruding it in a coffee melt. This reinstates the art of using coffee oil as the aroma fixative. The key drawbacks of this invention are: i) that the oil imparts unsightly oil slicks to the reconstituted coffee brews; ii) that as demonstrated in U.S. Pat. No. 6,544,576, coffee oil is characterized by a slow release rate, resulting in an imbalance in the aroma character.

Finally, Rushmore in U.S. Pat. No. 5,496,574 and Chmiel in U.S. Pat. No. 5,576,044 teach the benefits of hydrolysed coffee oil to overcome the unsightly oil slicks issue. Hydrolysed coffee oil, according to the author, has advantageous emulsifying properties and reduces the presence of large oil globules on the surface of the brew. The use of hydrolysed coffee oil as an emulsifying agent, mainly characterised for its fatty acids content, is not clear to somebody skilled in the art. Fatty acids themselves require emulsifying agents to be dispersed in water media. Furthermore, incorporating a material rich in free fatty acids into a beverage generally causes off flavours and accelerates staling due to the reactivity of the free acids ("Food oils and their uses" 2nd edition—T. Weiss—1983 the Avi Publishing Company"). Finally, if the aroma fixative is truly micro-emulsified in the brew, the droplets containing the aroma will be evenly distributed throughout the brew, rather than localised at the air/brew interface in a way which enhances above cup release.

An approach to provide heightened coffee preparation aroma might be to simply increase the amount of particles or capsules. The normal amount must be increased many times to produce a noticeable aroma and this approach results in a coffee beverage having an overwhelmingly strong taste and an unacceptable appearance.

In summary, the industry relies on combinations of coffee oil and coffee aroma, delivered using encapsulation techniques based on Palmer's 1975 invention or more recently based on co-extrusion. The major drawbacks of this approach are: i) unsightly oil slicks; ii) slow and unbalanced aroma release.

Most of the drawbacks presented by the described art were overcome by the teachings in U.S. Pat. No. 6,544,576 by replacing coffee oil with a novel generation of aroma carriers (volatile organic carriers). The new aroma carriers have beneficial release properties, enabling a fast and effective release of an aroma burst upon reconstitution of the instant beverage in water. The key features of this development can be described as follows.

A volatile coffee aroma is combined with a volatile, organic carrier to create a volatile coffee aroma composition which provides a good initial burst of coffee aroma at the time of preparation of a coffee beverage, while avoiding the problems noted above of residual surface oil and strong taste or aroma duing consumption. The use of a novel volatile carrier, having a combination of physical properties is key to this development and clearly distinguishes the aromatizing com-posi-tion from flavouring agents, either natural or artificial, which utilise traditional carriers. Traditional carriers are either too water-soluble, have a density greater than water, or are not sufficiently volatile to provide the preparation aroma impact desired while avoiding oily surface residues and potentially adverse effects on flavour. The volatile aromatizing composition is physically entrapped, preferably by encapsulating, in solid, water-soluble particles to reduce evaporation and oxidation during storage.

The use of those volatile organic carriers may provide several advantages. Since the volatile organic carrier is at most sparingly water-soluble, the carrier and aroma entrapped in the particle will be present as a separate liquid phase. This separate liquid phase in the particle is very important because it will prevent the rehydrating liquid from dissolving the majority of the aroma in the brew upon dissolution of the soluble coffee particle. Since the volatile carrier has a density less than the density of water, it will furthermore float to the surface of coffee beverages, where it can release aroma directly into the air above the beverage product at the time that it is prepared. This effect is desirable since it will serve to minimize incorporation of coffee aroma in the water phase by dissolution as described above, and to maximize the intensity of coffee aroma perceived by the consumer. Also, since volatile carriers rapidly evaporate along with the aroma, they do not leave behind an undesirable oil slick on the surface of the coffee beverage as occurs in applications that utilize non-volatile carriers such as coffee oil or other triglyceride oil.

In summary, to overcome the lack of aroma at the preparation stage, the coffee art has rarely focused on the quantity and quality of aroma constituents, but rather on the release vehicle and external constituents, like liquid carriers, to enhance release. The development described in the previous paragraph has perfected the approach using aroma carriers, and it is a significant improvement over the former art, however it still relies on an external ingredient, an aroma carrier, to deliver aroma.

There is still the need for an effective method for releasing aroma above a cup of coffee, which does not rely on the use of a carrier. In other words, the object of this invention is to provide aromatizing compositions which would, in their performance, match the advantages provided by the volatile organic carriers, and exceed the advantages of the coffee oil and aroma combinations, i.e., does not affect the appearance and the taste of the reconstituted product.

SUMMARY OF THE INVENTION

The present invention relates to aromatization particles comprising a water-soluble coffee matrix and an aromatizing composition comprising volatile characteristic coffee aroma constituents wherein said water-soluble coffee matrix is essentially fat-free and contains essentially no coffee oil, its derivatives or vegetable oil and wherein said water-soluble coffee matrix contains a physically entrapped separate liquid phase comprised of said volatile characteristic coffee aroma constituents.

While fat, coffee oil, its derivatives or vegetable oil are not necessary for the present invention and are not intentionally introduced in the process as aroma carrier for above cup release as per prior art, their presence does not disturb its effectiveness.

The diameter of the particles is preferably in the range of 100 μm to 1 cm.

The aromatizing composition preferably has a vapor pressure of at least 0.1 mm Hg at 25° C. and preferably contains
  10% to 100%, preferably 25% to 100% and even more preferably 50% to 100% by weight of compounds having a boiling point below 150° C., and/or
  more than 50% by weight of compounds having a water-solubility of less than 10% by volume at 25° C., and/or
  up to 100%, preferably up to 50% and even more preferably up to 25% by weight of a frost aroma.

A frost aroma is an aroma derived from the frost obtained by cryogenic condensation of coffee aroma vapors.

The aroma constituents of the aromatizing composition are preferably present in a concentration of at least 700 μg/g, more preferably at least 1000 μg/g and even more preferably at least 1500 μg/g particles. In some cases they can be present in a concentration of at least 3000 μg/g or even at least 5000 μg/g particles or more.

The invention further relates to a process for preparing such aromatizing particles by the steps of:
  (a) preparing an aromatizing composition comprising volatile characteristic coffee aroma constituents,
  (b) preparing a coffee extract to receive the aromatizing composition of step (a) by whipping or injecting gas into said coffee extract to entrap gas bubbles,
  (c) mixing the aromatizing composition of step (a) into the gasified coffee extract of step (b) with or without additional gasification,
  (d) forming droplets of the mixture of step (c), preferably by using a syringe, pipette, nozzle, or any suitable pneumatic, hydraulic, or dosing device, or solidifying the mixture and grinding it,
  (e) mixing the droplets obtained in step (d) into dry milled water-soluble coffee powder,
  (f) drying the mixture obtained in step (e) at room temperature or elevated temperatures, and
  (g) separating the particles obtained in step (f) from excess coffee powder, wherein said volatile characteristic coffee aroma constituents are present in a concentration of at least 700 μg/g particles.

The coffee extract used in step (b) preferably has a solids content of 3% to 60% by weight, 70% by weight or even 80% by weight.

Preferred embodiments are to pre-chill the aromatizing composition of step (a) and/or the coffee extract of step (b) before mixing and to freeze the droplets of step (d) before mixing into the dry milled water-soluble coffee powder according to step (e).

In a further preferred embodiment, the aromatizing composition of step (a) and/or the coffee extract of step (b) are frozen below a temperature at which they could be ground, wherein the frozen particles obtained upon grinding are mixed into the dry milled water-soluble coffee powder according to step (e).

Step (e) may be carried out on a vibrating conveyor.

The invention also relates to the use of the aromatizing particles for aromatizing food products, especially soluble coffee.

The invention also relates to food products containing 0.1% to 50%, preferably 1% to 40% and even more preferably 2 to 25% by weight of the aromatizing particles. The preferred food product is soluble coffee.

DETAILED DESCRIPTION OF THE INVENTION

As mentioned above, the coffee art has focused the developments on the release vehicle and external constituents like liquid carriers to enhance the above cup release. The quantity and the quality of the aroma constituents and the structure of the particles were not discussed.

In order to increase the above cup aroma or preparation aroma one could simply think of increasing the amount of particles in the soluble coffee or increasing the loading of the particles or capsules with a higher amount of aromatizing compounds. Unfortunately, such attempts have not been successful. The use of too many particles or capsules of the prior art type leads to the introduction of more capsule material, particularly coffee oil which accumulates as an oil film on the surface of the coffee beverage. Such oil films are readily apparent and are widely known to impair consumer acceptance of instant coffee.

Some improvement of the above cup aroma can be obtained by increasing the loading of aroma constituents in the capsules or in the carrier, but this typically leads to an overwhelming strong or unbalanced flavour in the product when consumed.

It has surprisingly been found within the present invention that a significant increase in the loading of the aromatizing particles with aromatizing compositions leads, in the absence of coffee oil, its derivatives or vegetable oil, to a two-phase structure of the particles. The particles contain a separate liquid phase comprised of the aromatizing composition in the form of small liquid droplets.

The combination of physical properties of the aromatizing composition, especially the poor affinity for water, facilitates the formation of this separate phase upon drying of the water out. This separate liquid phase in the particle is very important because it will prevent the aroma ending up in the brew upon dissolution of the particle. As discussed earlier, the combination of poor affinity for water and the buoyancy of the aromatizing composition allow the volatile aroma components to evaporate above the cup.

The present invention provides a more intense preparation aroma while deleterious effects on quality are avoided. If the aromatization particles of the present invention are used in soluble coffee, the consumer is provided with two distinct and desirable aroma experiences. Intense aroma, derived from the high release efficiency of the novel aroma system described herein may be perceived during coffee beverage preparation, and normal strength flavour, more typical of widely used low release efficiency conventional aroma systems, may be perceived during subsequent consumption.

It is an essential feature of this invention to localize the aroma constituents to be released above cup in discrete portions of the dehydrated beverage. To create the beneficial two-phase aromatizing composition in the brew, it is essential to localize large concentrations of the aroma in discrete portions of the powder or granulated product. High local concentrations of preferably at least 700 µg/g, more preferably 1000 µg/g, even more preferably 1500 µg/g and in some cases as high as 5000 µg/g are essential to create the beneficial two-phase behaviour which hinders aroma dissolution in the brew.

When large concentrations of aroma are incorporated into a particle without the addition of a liquid aroma carrier (coffee oil or its derivatives, or a vegetable oil), the aroma release matches the release of volatile organic carriers. The key advantage is the release of an authentic coffee aroma burst without the use of an aroma carrier. This is a great advantage over the prior art described above.

According to the present invention, this high local concentration of coffee aroma is essential to exploit the beneficial physical properties of some abundant coffee aroma constituents to create an aromatizing composition two-phasic with water and having a temporary existence at the temperature of coffee beverage preparation.

The Aromatizing Composition

Various coffee aromas may be used for the aromatization particles of the present invention. The following coffee aromas are useful, but not limiting:

Coffee aromas extracted from green coffee beans (bullet points illustrate possible execution)
   Aromas evolved during steaming of green coffee
   Aromas extracted from green coffee beans with solvents
   Aromas evolved during grinding of green coffee beans
Coffee aromas generated during roasting and curing of coffee beans
   Roaster aroma gases
   Curing aroma gases
   Coffee aromas released during grinding of roasted coffee beans
   Coffee aromas evolved during steaming of roasted coffee beans or during steaming of ground roasted coffee
Coffee aromas generated and evolved during processing of roasted coffee to instant coffee
   Coffee aroma generated during extraction of roasted coffee with hot water
   Coffee aroma generated during hydrolysis of roasted coffee with hot water or steam
   Coffee aroma generated during heat treatment of green or roasted coffee aqueous solutions (e.g. evaporation of instant coffee extracts)
Coffee aromas generated and evolved during processing of spent coffee grounds
   coffee aroma generated during burning of spent grounds
   coffee aroma evolved during high temperature extraction of partially extracted grounds
Coffee aromas generated by bio-processing coffee oil, green coffee or spent coffee grounds
   Coffee aroma generated by treating spent coffee grounds with an hydrolytic enzyme.

Figure 1:
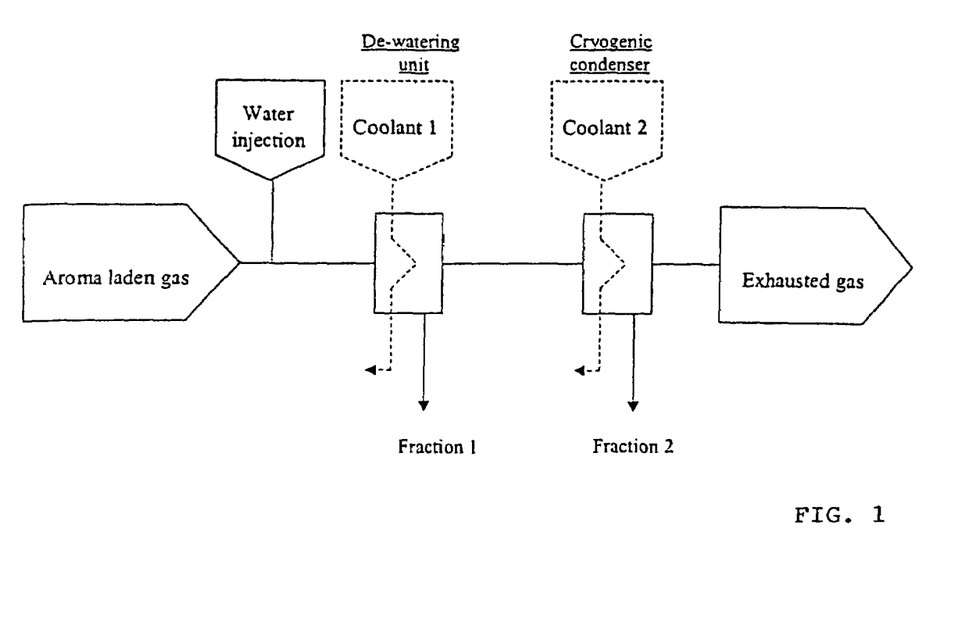
FIG. 1 is a flow-diagram illustrating a preferred process for producing aromatizing compositions which are useful for the present invention.

The preferred methods for the preparation of the aromatizing composition involve the depletion of the less volatile and more water-soluble components, combined with an increase of the total volatile coffee aroma concentration. For example, aroma-rich vapors are drawn from roast and ground coffee by means of vacuum or an inert carrier gas as shown in FIG. 1.

The aroma-laden gas can be conveniently drawn from "fresh" percolation columns while they are filled with liquor, or during steam distillation of roast coffee, or during grinding of whole roasted beans.

Natural coffee aroma tends naturally to be lipophilic and sparingly water soluble in the concentrate form, it is nevertheless possible to remove the least volatile compounds as conventional in the art to obtain a composition which, when added in a concentrate form to hot water, will release well above cup.

Further depletion of water-soluble and non-volatile aroma compounds can be carried out by:
Enriching the gas in moisture, by injecting steam or spraying water (this is not required for percolation vent gas, which is already saturated with moisture)
Condensing the water out of the gas stream, by passing the vapors in a condenser at a temperature below 10° C., by passing the vapors in a water ring vacuum pump (the most water-soluble compounds will be lost in the water, fraction 1).

The remaining aroma (fraction 2) is therefore enriched in sparingly water-soluble and volatile compounds. This composition has ideal physical properties for evaporating from a hot water matrix such as an instant coffee beverage.

The carbon dioxide and the odorants remaining in the gas stream are collected by cryo-condensation, typically at a temperature below −80° C., as conventional in the art.

The resulting so-called "frost" can be used as such or in combination with other coffee aroma sources for the preparation of the aromatization particles of the present invention.

Another preferred coffee aroma source is the untreated condensate, collected by pulling vacuum on a commercial percolation column during the draw phase of the cycle and condensing the vapors.

The aromatizing composition which has been treated according to the above-mentioned preferred embodiment of the present invention in order to separate the most water-soluble and least volatile compounds preferably has a vapor pressure of at least 0.1 mm Hg at 25° C. and preferably contains
- 10% to 100%, preferably 25% to 100% and even more preferably 50% to 100% by weight of compounds having a boiling point below 150° C., and/or
- more than 50% by weight of compounds having a water-solubility of less than 10% by volume at 25° C., and/or
- up to 100%, preferably up to 50% and even more preferably up to 25% by weight of an aroma frost as obtained for example by the above-described process.

The above is a preferred, but not limiting embodiment. Other separation methods are acceptable. Another preparation method allowing the depletion of the undesirable compounds characterised by having low volatility and poor affinity for water is described in Example 2.

The Preparation of the Aromatization Particles

In general, any method of physical entrapment can be used that is effective in converting the desired coffee aroma composition into particulate form. Preferred methods produce particle size, density and surface roughness compatible with the bulk material to be aromatised, the dispensing and/or mixing systems of the manufacturing process and mode of use of the product by consumers in their homes or through vending systems or by caterers.

Yet other methods may produce particles which are differentiated from the bulk product to signal to consumers and customers the presence of the improved aromas.

The preferred starting material for the preparation of aromatization particles is a mixture consisting of water, instant coffee solids and aromatic coffee substances. Preferred compositions for the instant coffee solution range from 2% to 70% by weight instant coffee solids.

The aromatic coffee substances are incorporated in the coffee solution by different methods, depending on the physical state of the aroma source. Coffee aroma recovered as frost can be conveniently incorporated using the high pressure process described in U.S. Pat. No. 3,979,528 (General Foods, Mahlmann) and Example 2.

Aqueous coffee aroma solutions can be mixed with dry instant coffee solids as in Example 2 or with instant coffee solutions prepared by evaporating roasted and ground coffee extracts.

A preferred method to obtain particle buoyancy is to foam the aromatizing coffee solutions described above by dispersing bubbles of an inert gas. Preferred gases are nitrogen and carbon dioxide. The steps disclosed in the gasification method of U.S. Pat. No. 5,882,717 (Panesar et al., Kraft Foods) and used in Example 3 are convenient.

Suitable methods to convert the aromatizing composition into particles include fluidized bed coating, extrusion, spray drying, freeze-drying, absorption, granulation and co-extrusion. Any particulate produced by these methods that have undesirably small particles may be advantageously agglomerated or granulated to increase the size and buoyancy of the particulate or to modify its dissolution rate in a coffee beverage.

A preferred method consists of adding drop-wise the foamed aromatizing composition into liquid nitrogen to form small frozen particles as described in Example 3. These particles are then separated from the liquid nitrogen and added to an excess quantity of finely milled instant coffee powder. Upon warming and slow desiccation in this powder over two days, the frozen particles are transformed into dry solid coffee particles containing the aromatizing composition within a hard glassy shell.

Another preferred method consists of freezing the foamed aromatizing composition below a temperature at which it could be easily ground and grinding this solid slab is described in Example 3. The frozen particles are then contacted with an excess quantity of finely milled instant coffee. A preferred method is to fluidize the powder on a vibrating conveyor. Upon warming and initial desiccation in this powder over 30 minutes, the frozen particles are transformed into solid coffee particles containing the aromatizing composition within a hard glassy shell and a moisture content below 15%. These particles are then added to an excess quantity of freeze dried coffee where the desiccation is completed.

A less preferred method consists of spraying the droplets of the aromatizing composition directly in a fluidised bed of instant coffee powder without a freezing step.

Use of the Aromatization Particles for Producing Food Products

The aromatization particles of the present invention can be used for different types of food products, especially instant coffee. The particles are mixed with the food such that the food products contain 0.1% to 50%, preferably 1% to 40% and even more preferably 2% to 25% by weight of aromatization particles of the present invention.

Food compositions of interest are for example:
- Dehydrated coffee-based beverages (instant coffee, flavoured instant coffee, instant cappuccino, instant whitened coffee, instant espresso)
- Roasted and ground coffee, flavoured roasted and ground coffee
- Dehydrated cocoa-based beverages (instant chocolate, flavoured instant chocolate, flavored instant chocolate)
- Dehydrated desserts (instant milk shakes, instant custard, instant gelatine, instant pudding)

Procedures for Mixing the Particles with Different Types of Products

In general, any mixing method can be used that is effective at dispersing the particles evenly across product servings.

Preferred mixing methods to distribute the particles in bulk products are tumblers (for example double cone or twin shell) and stationary shell mixers (for example ribbon blenders, vertical screw mixers, Muller mixers). Mixing methods generating size reduction (for example impact mixing) are less preferred as they do not preserve the particles integrity.

Mixing the aromatizing particles in the bulk product to be aromatized is particularly important when the product is distributed in the form of jars or packs containing multiple servings. If the product servings are pre-dosed, as for example in single serving stick-packs or sachets, mixing is less critical. In the case of single serving packaging the particles can be simply dosed in the sachets at the filling station.

The present invention is now further illustrated by specific examples which, however, are not intended to limit the scope of the invention.

EXAMPLES

Example 1

Production of an Aromatizing Composition

The most common prior art method for preparing coffee aromatizing compositions is to treat roasted and ground coffee in a percolator with saturated steam to separate essential aroma constituents. The separated aroma constituents are obtained as condensate by passing the vapors s in a glycol chilled condenser. An example of preparation, used in prior art U.S. Pat. No. 4,520,033, follows:

500 kg of roasted and ground coffee of a particle size of approximately 2.3 mm is first moistened to a water content of approximately 50% by weight, relative to the dry roasted and ground coffee. This coffee is treated in a percolator with saturated steam at a pressure of approximately 0.75 barg for approximately 10 minutes. The steam loaded with coffee aroma constituents is condensed at a temperature of approximately 5° C. to a condensate quantity of approximately 5% by weight, relative to the quantity of dry roasted and ground coffee used. This condensate is aroma "a".

Example 2

Production of a Modified Aromatizing Composition

The following preparations deplete an aroma source of compounds with low volatility, and are preferred embodiments of this invention.

Approximately 300 L of aroma "a" of Example 1 is treated counter-currently in a first packed column with saturated steam at a pressure of approximately 0.3 barg. The steam loaded with coffee aroma constituents is condensed at a temperature of approximately 5° C. to a condensate quantity of approximately 25% by weight, relative to the quantity of aroma "a" fed. This condensate is aroma "b". Approximately 80 L of aroma "b" is treated in a second packed column with saturated steam at a pressure of approximately 0.3 barg. The steam loaded with coffee aroma constituents is condensed at a temperature of approximately 5° C. to a condensate quantity of approximately 20% by weight, relative to the quantity of aroma "a" fed. This condensate is aroma "c".

500 kg of roasted and ground coffee of a particle size of approximately 2.1 mm is loaded into a percolator and is first moistened to a water content of approximately 50% by weight, relative to the dry roasted and ground coffee. Vacuum of approximately 200 mbar is pulled on the percolator for approximately 3 minutes while soluble coffee extract is fed in the percolator. The vapour, loaded with coffee aroma constituents, is pulled from the percolator and condensed at a temperature of approximately 5° C. The non-condensable part of this vapour is passed in a column loaded with Zeolite adsorbent (Zeolum®, Tosoh Corporation), and then condensed cryogenically at a temperature of −130° C. as a frost. 80 kg of this coffee frost aroma were fixed in 40 kg of evaporated arabica instant coffee extract (53% by weight solids). The frost was loaded in an autoclave, the autoclave was closed and heated up to approximately 30° C. The pressure was then reduced to 10 bar over a period of 2 minutes. The extract was pumped in the autoclave. The autoclave is re-heated to approximately 30° C. and the pressure was released to atmospheric over a period of approximately 4 hours. 50 g of this coffee extract were diluted with 50 g of the evaporated arabica instant coffee extract (53% by weight, solids). This extract is aroma "d".

Example 3

Production of Aromatization Particles Production of Aromatization Particles from Aroma "a"

This example illustrates the production of prior art aromatization particles.

An aromatized coffee solution was prepared by re-dissolving approximately 1.2 kg of dried instant coffee in approximately 1.2 kg of aroma "a". This aromatized coffee solution was placed in a stirred glass reactor and was then cooled to −2° C. Nitrogen was bubbled under stirring in the solution to achieve a density of approximately 800 g/L. The solution was then poured into a stainless steel tray and placed in a −40° C. freezer for 8 hours. The frozen slab obtained was ground in a cold room to obtain frozen particles ranging approximately from 0.5 mm to 4 mm. The frozen particles were sieved to recover only the fraction between 1 mm and 3.35 mm.

Approximately 20 g of these frozen particles were placed in bags containing approximately 300 g of fine instant coffee powder. The powder and granules were left to equilibrate in a closed container for 48 h, the dried particles were then sieved out from the powder. The resulting particles are labeled "e".

The aroma content of particles "e" was measured at 122 µg/g of coffee solids. The analysis was carried out using a GC (gas chromatography) technique to measure the amount of aroma present in the head-space of a closed 22 mL vial containing 0.3 g of particles and 6 mL of water.

Production of Aromatization Particles from Aroma "c"

An aromatized coffee solution was prepared by re-dissolving approximately 1.2 kg of dried instant coffee in approximately 1.2 kg of aroma "c". The same procedure as for aroma "a" was followed.

This aromatized coffee solution was placed in a stirred glass reactor and was then cooled to −2° C. Nitrogen was bubbled under stirring in the solution to achieve a density of approximately 800 g/L. The solution was then poured into a stainless steel tray and placed in a −40° C. freezer for 8 hours. The frozen slab obtained was ground in a cold room to obtain frozen particles ranging approximately from 0.5 mm to 4 mm. The frozen particles were sieved to recover only the fraction between 1 mm and 3.35 mm.

Approximately 20 g of these frozen particles were placed in bags containing approximately 300 g of fine instant coffee powder. The powder and particles were left to equilibrate in a closed container for 48h, the particles were then sieved out from the powder. The resulting particles are labelled "f". The aroma content of particles "f" was measured at 982 µg/g of coffee solids.

Production of Aromatization Particles from Aroma "d"

20 g of the aromatized coffee solution "d" were blended with 80 g of evaporated arabica instant coffee extract using a Silverson high shear rate mixer set at 4000 rpm for 1 minute. Nitrogen was bubbled in the solution to achieve a density of approximately 750 g/L. This solution was added drop-wise in liquid nitrogen to form frozen particles ranging from 1 mm to 4 mm diameter. Excess liquid nitrogen is separated and the frozen particles are contacted with milled instant coffee powder, in a ratio of approximately 20:1 powder:particles. The powder and particles were left to equilibrate in a closed container for 48 hours, the particles were then sieved out from the powder. The resulting particles are labelled "g" and range from 1 mm to 3.5 mm. The aroma content of particles "g" was measured at 2120 μg/g of coffee solids.

Production of Aromatization Particles from Aroma "a" (Comparative, Using Coffee Oil and without Freezing Step)

This example illustrates the production of prior art aromatization particles.

An aromatized coffee solution was prepared by re-dissolving approximately 100 g of dried instant coffee in approximately 100 g of aroma "a". 10 g of plain coffee oil were emulsified into the mixture using a Silverson high shear rate mixer set at 8000 rpm for 1 minute. Nitrogen was bubbled in the solution to achieve a density of approximately 750 g/L. This emulsion was added drop-wise to a vibrating bed of fine milled coffee powder, to obtain a final mixture of 20 g coffee solution in 400 g fine coffee powder. The powder and granules were left to equilibrate in a closed container for 48 h, the particles were then sieved out from the powder. The resulting particles are labelled "h" and range from approximately 1 mm to 3.5 mm. The aroma content of particles "h" was measured at 100 μg/g of coffee solids.

Example 4

Properties of the Aromatization Particles Burst Upon Crushing Particles

An effective way of demonstrating the presence of an entrapped separate liquid phase of volatile aroma is to examine the aroma released upon crushing the particles.

The following method was used to examine the aroma released upon crushing aromatization particles: 3 particles are placed in the centre of a circular (8.3 mm radius) Whatman 40 paper filter; the paper filter is folded in half to cover the particles; the particles are crushed by applying pressure with the back of a spoon for approximately 5 seconds; the crushed particles are left for a further 5 seconds in the folded paper filter; a sniffing panel is used to evaluate the samples; panellists evaluate the aroma released upon crushing the particles at a distance of approximately 10 cm.

The particles prepared above and reference instant coffee products were examined using this method. The results indicate that the particles manufactured from the aromatizing compositions of the current invention are differentiable:

| Product | Panel evaluation after crushing |
| --- | --- |
| Particles "e" | No noticeable aroma |
| Particles "f" | Noticeable aroma |
| Particles "g" | Noticeable aroma |
| Particles "h" | No noticeable aroma |
| Reference particles - commercial soluble coffee 1, soluble coffee not containing aromatization particles | No noticeable aroma |
| Reference particles - commercial soluble coffee 2, soluble coffee not containing aromatization particles | No noticeable aroma |

Reconstitution in Hot Water

The following method was used to assess the aroma released above cup upon reconstitution of aromatized products in hot water: approximately 0.1 g of particles were weighed in an empty and dry 200 mL cup; 1.6 g commercial soluble coffee 2 was added; 180 mL of water heated to 75° C. were poured from a kettle into the cup; panelists evaluate the aroma intensity at a distance of approximately 20 cm after 10 seconds from make-up and the flavor of the coffee after 2 minutes from make-up. The appearance of the products was assessed after 1 minute from make-up prior to flavor evaluation.

The results indicate that the particles manufactured from the aromatizing compositions of the current invention are effective at heightening the aroma experience without deleterious effects on the brew flavor:

| Product | Aroma above cup | Flavor | Appearance |
| --- | --- | --- | --- |
| Commercial soluble coffee 2 without aromatization particles | Weak | Reference | Reference |
| Commercial soluble coffee 2 with particles "e" | Weak | No difference | No difference |
| Commercial soluble coffee 2 with particles "f" | Strong | No difference | No difference |
| Commercial soluble coffee 2 with particles "g" | Strong | No difference | No difference |
| Commercial soluble coffee 2 with particles "h" | Weak | No difference | Oil slick visible |

Example 5

Flavor Impact from High Dosage of Prior Art Particles (Comparative)

Higher doses per serving of the prior art particles "h" were evaluated following the same procedure of Example 3:

| Commercial soluble coffee 2 | Particles | Aroma above cup | Flavor | Appearance |
| --- | --- | --- | --- | --- |
| 1.7 g | 0.0 g "h" | Reference | Reference | Reference |
| 1.6 g | 0.1 g "h" | No difference | No difference | Oil slick visible |
| 1.4 g | 0.3 g "h" | No difference | Slight difference | Oil slick and particles visible |
| 1.2 g | 0.5 g "h" | No difference | Noticeable difference | Oil slick and particles visible |
| 0.7 g | 1.0 g "h" | Slight difference | Noticeable difference | Oil slick and particles visible |
| 0.0 g | 1.7 g "h" | Noticeable aroma | Overwhelming impact | Oil slick and particles visible |
| 1.6 g | 0.1 g "g" | Noticeable aroma | Similar to reference | Similar to reference |

A noticeable cup aroma can be perceived when large quantities of particles are used, however cup appearance and flavor are impaired. The oil impairs dissolution of the particles and generates a slick upon reconstitution. The flavor impact is overwhelmingly strong, driven both by large quantities of oil and of aroma dissolved in the brew due to the poor release. The performance of the particles "g" of the invention characterized by having the entrapped separate phase of volatile aroma as evidenced in Example 4, illustrates the benefit of the new art. The aroma differentiation above the cup is not accompanied by the deleterious effects on flavor and appearance typical of the prior art.

Example 6

Oil-Containing Particles (Comparative)

Dissolution of Oil-Containing Particles

The presence of significant quantities of coffee oil has also a negative impact on particles' dissolution rate. The following example illustrates this effect.

The following method was used to assess the dissolution rate of particles upon reconstitution in hot water: approximately 10 particles are added into an empty and dry 200 mL cup; 180 mL of water heated to 75° C. were poured from a kettle into the cup; panelists stir 3 times clock-wise and assess the appearance after 10 seconds, 30 seconds and 2 minutes.

| | Number of floating particles visible | | |
|---|---|---|---|
| Particles | After 10 seconds | After 30 seconds | After 2 min |
| "g" | 2 | none | none |
| "h" | 10 | 10 | 10 |

Aroma Release from Coffee Oil

The following section illustrates how the presence of coffee oil hinders release of aroma from the surface of a brew.

In order to illustrate this negative effect, a multi-component model flavor was compounded to permit quantitative analysis of aroma release. A diverse mixture of six components was utilized in the model flavor in order to span a wide range of boiling point, water solubility, density, and chemical functionality. The purity of all the commercial compounds used in this study was greater than 99%.

These compounds were hexanal, diacetyl, 2,3-dimethylpyrazine, 4-ethylguaiacol, 3-methylbutanal (isovaleraldehyde), and 2-methylfuran.

The model flavor was compounded in soybean oil at 2 different levels, 5% and 15% by weight. Soybean oil was used as a reference carrier to depict the general performance of non-volatile triglyceride oils such as coffee oil, typical of the prior art. The pure model flavor without carrier was used to depict the general performance of the aromatizing compositions of this invention. Aroma release was quantified by injecting 4 μL of the solutions into a 250 mL jar containing 200 mL water preheated to 85° C. In each case, the internal headspace of the jar was rapidly swept with nitrogen gas and volatiles collected on TENAX traps at six different collection time intervals. These collection intervals are 0-10 sec, 10-20 sec, 30-60 sec, 60-90 sec and 90-120 sec. The analysis was carried out using a GC/MS (Gas chromotography/mass spectroscopy) technique to measure the amount of each flavor that is evaporated over time to produce aroma.

Time resolved release: aroma recovered at each time interval

| | % by weight of recovered flavor (based on injected weight) at different intervals (seconds) | | | | | |
|---|---|---|---|---|---|---|
| Solution | 0-10 | 10-20 | 20-30 | 30-60 | 60-90 | 90-120 |
| 5% flavor in oil | 7.9 | 7.7 | 5.1 | 7.2 | 3.9 | 2.6 |
| 15% flavor in oil | 10 | 6.9 | 4.9 | 6.2 | 3.1 | 1.8 |
| flavor, no carrier | 23.3 | 9.3 | 3.6 | 4.2 | 2.9 | 1.9 |

Cumulative release: aroma recovered over 2 minutes

| Solution | Total aroma recovery in 2 minutes (% by weight based on injected weight of flavor) |
|---|---|
| 5% flavor in oil | 34 |
| 15% flavor in oil | 33 |
| flavor, no carrier | 45.5 |

The data above illustrate that the presence of an oily phase at the air water interface hinders the aroma release rate and efficiency.

Aroma Release from Emulsified Coffee Oil

The following section illustrates how the use of an emulsifier can overcome the unappealing oil slick formation upon make-up, but how aroma release is further reduced.

100 mL of water were heated to 70° C. and placed in a 200 mL glass beaker. 2 drops (one drop is approximately 0.015 g) of plain aromatized coffee oil were added onto the surface of the hot water. An oil slick was clearly visible even after stirring. A panel of experts concluded that a weak aroma could nevertheless be perceived above the cup.

In order to achieve good emulsification, 10 g of the same aromatized coffee oil were blended with 15 g Polysorbate 60 (Aldrich-Sigma (UK)). 100 mL of water were heated to 70° C. and placed in a 200 mL glass beaker. When 4 drops of this mix were added to the coffee solution, instantaneous break-up of the drops was observed, dispersing the oil into the bulk of the solution. A panel of expert sniffers perceived a noticeable reduction in the aroma above the cup when compared to the non-emulsified reference. Emulsification of the oil droplets and consequent dispersion in the bulk of the solution of the aroma constituents effected a noticeable reduction in the release efficiency.

Example 7

Two-Phasic Nature of Aromatizing Compositions of the Present Invention

The following examples illustrate the two-phasic nature of the aroma of the present invention upon reconstitution in water.

The aim is to illustrate how the aromatizing compositions of the present invention create a beneficial two-phase behavior upon reconstitution in water, which is transitory as the flavor evaporates from the brew and does not impair cup appearance. The presence of the two-phase behavior is demonstrated by reconstituting the particles in cold water, to prevent immediate evaporation of the volatile aroma. The reconstitution is repeated in hot water to demonstrate that the volatile aroma evaporates from the brew without leaving unsightly slicks and to confirm the transitory existence of this separate phase after reconstitution.

The following method was used: approximately 0.1 g of particles are added into an empty and dry 200 mL cup; 180 mL of cold tap water were poured into the cup; panelists stir 20 times clock-wise the solution and assess the appearance after 30 seconds. The same procedure was followed replacing the cold water with water heated to 75° C., panelists evaluate the aroma above cup after 15 seconds, the appearance after 30 seconds.

| Product | Appearance Reconstitution in cold water | Appearance Reconstitution in hot water | Aroma above cup Reconstitution in hot water |
|---|---|---|---|
| Reference - commercial soluble coffee 2 without aromatizing particles | Homogenous solution | Homogenous solution | Weak |
| Particles "e" | Homogenous solution | Homogenous solution | Weak |
| Particles "g" | Pale yellow floating liquid phase visible | Homogenous solution | Strong |
| Particles "h" | Oil droplets and particles visible | Oil droplets and particles visible | Weak |

The transitory two-phase behavior upon reconstitution minimizes the dissolution of the entrapped aroma in the brew. The particles "g" of the invention successfully differentiate aroma above cup without deleterious effects on the brew appearance.

Figure 2:
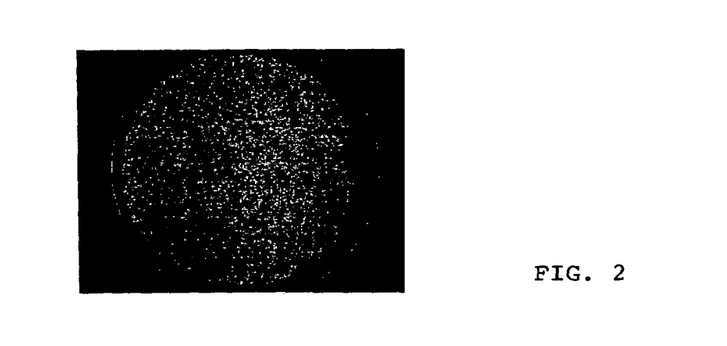
FIG. 2 illustrates the two-phase character of the aromatizing particles of the present invention.

FIG. 2 illustrates the reconstitution of particles "g" in cold water.

The invention claimed is:

1. A process for preparing aromatization particles including a water-soluble coffee matrix and an aromatizing composition, comprising the steps of
   (a) preparing the aromatizing composition comprising volatile characteristic coffee aroma constituents obtained from coffee beans so that the aromatizing composition contains essentially no coffee oil, its derivatives or vegetable oil and contains essentially no non-coffee volatile organic carriers and contains more than about 50% by weight of compounds having a water-solubility of less than about 10% by volume at about 25° C.;
   (b) preparing a coffee extract to receive the aromatizing composition of step (a) by whipping or injecting gas into said coffee extract to entrap gas bubbles;
   (c) mixing the aromatizing composition of step (a) into the gasified coffee extract of step (b), with or without additional gasification;
   (d) forming droplets of the mixture of step (c);
   (e) mixing the droplets obtained in step (d) into dry milled water-soluble coffee powder;
   (f) forming particles by drying the mixture obtained in step (e) at room temperature or elevated temperatures; and
   (g) separating the particles obtained in step (f) from excess coffee powder, wherein said volatile characteristic coffee aroma constituents are present in a concentration of at least 700 µg/g particles.

2. Process according to claim 1, wherein said coffee extract has a solids content of 3% to 60% by weight.

3. Process according to claim 1, wherein said coffee extract has a solids content of 70% by weight.

4. Process according to claim 1, wherein said coffee extract has a solids content of 80% by weight.

5. Process according to claim 1, wherein the aromatizing composition of step (a) and/or the coffee extract of step (b) are pre-chilled before mixing and wherein the droplets of step (d) are frozen before mixing into the dry milled water-soluble coffee powder according to step (e).

6. Process according to claim 1, wherein the aromatizing composition of step (a) and/or the coffee extract of step (b) are frozen and then ground into frozen particles, wherein the frozen particles obtained upon grinding are mixed into the dry milled water-soluble coffee powder according to step (e).

7. Process according to claim 1, wherein step (e) is carried out on a vibrating conveyor.

8. A process for preparing aromatization particles including a water-soluble coffee matrix and an aromatizing composition, comprising the steps of
   (a) preparing the aromatizing composition comprising volatile characteristic coffee aroma constituents by depleting volatile and water-soluble components from the volatile characteristic coffee aroma constituents so that the aromatizing composition contains more than about 50% by weight of compounds having a water-solubility of less than about 10% by volume at about 25° C. and has a vapor pressure of at least about 0.1 mm Hg at about 25° C.;
   (b) preparing a coffee extract to receive the aromatizing composition of step (a) by whipping or injecting gas into said coffee extract to entrap gas bubbles;
   (c) mixing the aromatizing composition of step (a) into the gasified coffee extract of step (b), with or without additional gasification;
   (d) forming droplets of the mixture of step (c);
   (e) mixing the droplets obtained in step (d) into dry milled water-soluble coffee powder;
   (f) forming particles by drying the mixture obtained in step (e) at room temperature or elevated temperatures; and
   (g) separating the particles obtained in step (f) from excess coffee powder, wherein said volatile characteristic coffee aroma constituents are present in a concentration of at least 700 µg/g particles.

9. The process of claim 8, wherein the volatile characteristic coffee aroma constituents are obtained from a coffee aroma-laden gas.

10. The process of claim 9, wherein preparing the aromatizing composition includes first enriching the coffee aroma-laden gas in moisture and then condensing the moisture enriched coffee aroma-laden gas.

11. The process of claim 10, wherein the condensing is carried out at a temperature below about 10° C.

12. The process of claim 9, wherein coffee aroma-laden gas is obtained from coffee aromas extracted from green coffee beans, coffee aromas generated during roasting and curing of coffee beans, coffee aromas generated and evolved during processing of roasted coffee to instant coffee, coffee aromas generated and evolved during processing of spent coffee grounds, coffee aroma evolved during high temperature extraction of partially extracted grounds, or coffee aromas generated by bio-processing coffee oil, green coffee, or spent coffee grounds.

* * * * *

UNITED STATES PATENT AND TRADEMARK OFFICE
CERTIFICATE OF CORRECTION

PATENT NO. : 7,470,443 B2
APPLICATION NO. : 10/947723
DATED : December 30, 2008
INVENTOR(S) : Ceriali et al.

It is certified that error appears in the above-identified patent and that said Letters Patent is hereby corrected as shown below:

- On cover page, under Foreign Application Priority Data, insert item --(30), Oct. 19, 2003 (EP) 03022899.3--

Signed and Sealed this

Eighteenth Day of August, 2009

David J. Kappos
*Director of the United States Patent and Trademark Office*